(12) United States Patent
Cretin

(10) Patent No.: US 11,971,325 B2
(45) Date of Patent: Apr. 30, 2024

(54) SYSTEM FOR CHECKING A CORRECT MOUNTING OF A SENSOR

(71) Applicant: Liebherr-Components Colmar SAS, Colmar (FR)

(72) Inventor: Marc Cretin, Colmar (FR)

(73) Assignee: LIEBHERR-COMPONENTS COLMAR SAS, Colmar (FR)

(*) Notice: Subject to any disclaimer, the term of this patent is extended or adjusted under 35 U.S.C. 154(b) by 0 days.

(21) Appl. No.: 17/821,029

(22) Filed: Aug. 19, 2022

(65) Prior Publication Data
US 2023/0069555 A1 Mar. 2, 2023

(30) Foreign Application Priority Data
Aug. 24, 2021 (DE) .................... 10 2021 121 862.4

(51) Int. Cl.
*F01N 11/00* (2006.01)
*G01M 15/10* (2006.01)

(52) U.S. Cl.
CPC .......... *G01M 15/102* (2013.01); *F01N 11/00* (2013.01); *F01N 11/002* (2013.01); *F01N 2550/24* (2013.01); *F01N 2560/021* (2013.01); *F01N 2560/026* (2013.01)

(58) Field of Classification Search
CPC .............. F01N 11/002; F01N 2550/24; F01N 2560/021; F01N 2560/026; G01M 15/102
See application file for complete search history.

(56) References Cited

U.S. PATENT DOCUMENTS

| | | | | |
|---|---|---|---|---|
| 4,491,921 A * | 1/1985 | Sugiyama | ........... | F02D 41/1479 123/695 |
| 7,797,930 B2 * | 9/2010 | Kusatsugu | .............. | F01N 11/00 60/284 |
| 8,959,892 B2 * | 2/2015 | McCoy | ................... | F02D 41/22 60/277 |
| 2004/0122565 A1 * | 6/2004 | Sakurai | ................... | F02D 41/26 701/1 |
| 2006/0011476 A1 * | 1/2006 | Hada | .................. | G01N 27/4065 204/426 |
| 2006/0218895 A1 * | 10/2006 | Wickert | .................. | F01N 11/00 60/285 |

(Continued)

FOREIGN PATENT DOCUMENTS

| | | |
|---|---|---|
| DE | 102007026786 A1 | 4/2008 |
| DE | 102016110167 A1 | 12/2016 |
| EP | 1686012 A1 | 8/2006 |

OTHER PUBLICATIONS

European Patent Office, Extended European Search Report Issued in Application No. 22189620.2, dated Jan. 18, 2023, Germany, 9 pages.

*Primary Examiner* — Matthew T Largi
(74) *Attorney, Agent, or Firm* — McCoy Russell LLP

(57) ABSTRACT

The present disclosure shows a system for checking a correct mounting of a plurality of sensors, in particular of sensors mounted in an engine system, comprising a controller configured for receiving signals from the plurality of sensors. The controller is configured to monitor a sequence and/or timing of the signals received from the sensors and to evaluate it with respect to a sequence and/or timing of a switching of a power supply to the sensors for checking the correct mounting of the sensors.

20 Claims, 7 Drawing Sheets

(56) References Cited

U.S. PATENT DOCUMENTS

| | | | |
|---|---|---|---|
| 2008/0077303 A1* | 3/2008 | Zushi | G01R 31/2829 |
| | | | 701/101 |
| 2009/0107114 A1* | 4/2009 | Ammineni | F02D 41/1446 |
| | | | 60/277 |
| 2018/0274469 A1* | 9/2018 | Glugla | F02P 5/1455 |
| 2020/0386182 A1* | 12/2020 | Lundström | F02D 41/222 |
| 2023/0006457 A1* | 1/2023 | Corley | B60L 53/80 |

\* cited by examiner

SYSTEM FOR CHECKING A CORRECT MOUNTING OF A SENSOR

CROSS REFERENCE TO RELATED APPLICATION

The present application claims priority to German Patent Application No. 10 2021 121 862.4, filed on Aug. 24, 2021. The entire contents of the above-listed application are hereby incorporated by reference for all purposes.

BACKGROUND

In many applications, an incorrect mounting of sensors which are of particular relevance, such as emission relevant sensors in an engine, should be either impossible or detected by the system.

One of the most efficient solution for reaching Diesel Tier 4 emission standards is based on urea water solution injection into the exhaust line, which converts harmful nitrogen oxides into "harmless" molecules in catalysts.

The amount of urea to be injected is estimated based on sensor information. In the same way, the emissions are measured with sensors of the same type. These sensors are the elements that guarantee emissions at any time.

Thus, organizations for certifying engines such as the EPA require that the system can detect an installation error of such sensors (voluntary or not) if the error is possible.

The most commonly used solution is that a non-installation is detected and to make sure that physically a wrong installation is impossible (mainly mechanically).

The mix-up of the sensors is today usually made impossible by:

an electrical information available in extra pins of the sensor;

a physical key in the connector (common solution in the automotive industry)

or software protection, for example using a model to check the consistency of the values.

These solutions become complex for a large number of sensors and might require changes on the sensor's side.

For example, a large diesel engine may require 6 sensors measuring NOx, 5 sensors measuring NH3. For this number of sensors, the coding of the connector or the addition of Pins become solutions either too complicated or too expensive.

The object of the present disclosure is to find a reliable and inexpensive solution to meet this demand of certification authorities. A further object is to find a solution that does not require any change on the sensor side, in order to reduce costs and delays.

The present disclosure provides a system for checking a correct mounting of a plurality of sensors, comprising a controller configured for receiving signals from the plurality of sensors. The controller is configured to monitor a sequence and/or timing of the signals received from the sensors and to evaluate it with respect to a sequence and/or timing of a switching of a power supply to the sensors for checking the correct mounting of the sensors.

Therefore, according to the present disclosure, the position information comes from the sensors' power supply and in particular the sequence and/or timing of the switching on or off of the power supply.

In an embodiment, a plurality of mounting positions is provided, at which a plurality of sensors are installed. Each mounting position may in particular comprise a mounting element for mounting the respective sensor. Each mounting positions may correspond to a corresponding measuring position.

In an embodiment, for a correct mounting, a specific sensor out of the plurality of sensors has to be installed at each one out of the plurality of mounting positions. Therefore, each sensor has a predefined position to which it is correlated and at which it should be installed for a correct mounting. This predefined position will make sure that the controller will be able to correlate, during operation, the signal of the sensor to the correct mounting position and therefore the correct measuring position.

In an embodiment, the checking of a correct mounting of a sensor comprises checking that the sensor is mounted at a correct mounting position out of the plurality of mounting positions, and in particular a check that the sensor is installed at the predefined position to which it is correlated and at which it should be installed for a correct mounting.

In an embodiment, the checking of a correct mounting of the plurality of sensors will detect a mix-up between the sensors, e.g. where at least two sensors have been mounted at incorrect mounting positions because the mounting positions have been mixed-up for the at least two sensors.

The present disclosure can be applied generally to any kind of sensors or applications.

In an embodiment of the present disclosure, the controller is used for checking a correct mounting of the plurality of sensors mounted in an engine, in particular an internal combustion engine.

As indicated above, the engine may comprise a plurality of mounting positions for mounting the plurality of sensors, such as different mounting positions on an element of the exhaust gas aftertreatment system or the engine body, such as upstream and downstream of a catalyst, and/or positions on different elements of the exhaust gas aftertreatment system or engine body, such as different exhaust gas ducts arranged in series or in parallel or different cylinders or cylinder heads of the engine, to which sensors are mounted.

In an embodiment of the present disclosure, the plurality of sensors are connected to a bus system and the signals from the sensors comprise communication signals exchanged via the bus system, wherein the bus system may be a serial bus system such as a CAN-bus system.

In an embodiment of the present disclosure, once a power supply to a sensor is switched on, it will communicate over the bus system. Once the power supply to a sensor is switched off, it will stop communicating over the bus system. The communication or stop in communication may be detected by the controller.

The communication by a sensor may either be cyclic, i.e. the sensor will automatically communicate a message at predetermined intervals, or may depend on interrogation by the controller, i.e. the sensor will communicate a message in reply to a request by the controller.

If the sensor works cyclically, the signals from the sensor will automatically appear or disappear from the bus with the switching on or switching off of a sensor. This can be checked by the controller to determine the sequence and/or timing of the signals received from the sensors.

If the sensor works on request, the signals from a sensor will appear or disappear with the switching on or switching off of a sensor once the sensor is interrogated. Therefore, for sensors that work on request, the controller will interrogate the sensors to determine the sequence and/or timing of the signals received from the sensors.

The present disclosure can be applied to plurality of sensors regardless of whether they are of the same type or not. However, there are particular advantages for sensors of the same type, because these are more difficult to check with respect to their correct mounting than sensors of different types, which usually differ also with respect to their connector.

Therefore, in an embodiment of the present disclosure, the plurality of sensors are of the same type and only differ with respect to their identifiers, in particular with respect to their electronic identifiers used during communication.

In an alternative embodiment of the present disclosure, the plurality of sensors are of at least two different types.

In an embodiment of the present disclosure, the controller is configured to check the correct mounting of the sensors by checking whether a sequence and/or point in time at which signals from the sensors are received or no longer received corresponds to an expected sequence and/or point in time with respect to a switching on or off of the power supply to the sensors.

In a first variant, the controller may individually control the sequence and/or points in time at which the switching on or off of the power supply to sensors is happening, and can therefrom determine an expected sequence and/or points in time for receiving or no longer receiving the signals, and compare it to the actual sequence and/or point in time for receiving or no longer receiving the signals.

In a second variant, the switching on or off of the power supply may also be performed in a predetermined sequence and/or with a predetermined order and time difference, e.g. by a hard-wired control of the power supply, and the controller may have stored in memory a sequence and/or order and time differences between the switching on or off of the sensors, and can determine an expected point in time for receiving or no longer receiving the signals from a second sensor from a point in time at which signals were received or no longer received from a first sensor.

In an embodiment of the present disclosure, the controller is configured to check the correct mounting of at least two or at least three sensors by checking whether the point in time at which respective signals from the sensors are received or no longer received corresponds to an expected point in time with respect to a switching on or off of the power supply to the sensors and/or to an expected sequence and time difference.

In an embodiment of the present disclosure, the controller is configured to control the switching on or off of the power supply to plurality of sensors.

Thereby, the controller may control the power supply to be switched on or off at a specific point in time. If the sensor is mounted correctly, the signals from the sensor will appear or disappear with a specific time delay after this point in time. Therefore, if the signals appear or disappear within a predefined time window after the power supply is switched on or off, the controller will determine that the sensor is mounted correctly. If the signals do not appear or disappear within the time window, the controller will determine that the sensor is not mounted or not mounted at the correct position.

The controller may be configured to output a signal indicating whether the sensor is mounted correctly or not.

In an embodiment of the present disclosure, the controller is configured to control the switching on or off of the power supply to the plurality of sensors. Thereby, the controller defines a specific point in time at which the power supply is switched on or off for each sensor.

In an embodiment of the present disclosure, the controller is configured to control the switching on or off of the power supply to the plurality of sensors to occur at different points in time. Thereby, the correct mounting of the plurality of sensors can be determined by the points in time at which their respective signals appear of disappear.

In an embodiment of the present disclosure, the controller is configured to sequentially switch the power supply to the plurality of sensors on or off.

In an embodiment of the present disclosure, the time difference between the switching on or off of the power supply of two consecutive sensors is larger than a time difference between the switching on or off of the power supply to a sensor and the appearance or disappearance of signals from the respective sensor.

In an embodiment of the present disclosure, the controller is configured to delay or advance a switching on of the power supply to a first sensor with respect to a second sensor at start-up and/or to delay or advance a switching off of the power supply to a first sensor with respect to a second sensor at shut-down.

The sensors may be switched on one after the other on start-up or switched off one after the other on shut-down.

In an embodiment of the present disclosure, the controller comprises a plurality of hardware switches for controlling the timing of the switching of the power supply to the plurality of sensors, the switches may have different time-delays for switching on or off following a switching on or off signal.

In an embodiment of the present disclosure, the switches are relays, in particular on- or off-delay relays normally open with timed closed or opened contact.

In an embodiment of the present disclosure, the controller is configured to temporally switch the power supply to a first sensor on while the power supply to a second sensor and, for instance, all other sensors remain switched off and/or to temporally switch the power supply to a first sensor off while the power supply to a second sensor and, for instance, all other sensors remain switched on.

In an embodiment of the present disclosure, the controller comprises a microcontroller for controlling the timing of the switching of the power supply to the plurality of sensors.

In an embodiment of the present disclosure, the plurality of sensors are of the same type and/or differ in their identifier.

In an embodiment of the present disclosure, the plurality of sensors are NOx-sensors and/or NH3-sensors and/or temperature sensors.

In an embodiment of the present disclosure, the plurality of sensors are sensors arranged on an exhaust gas aftertreatment system of the engine.

In an embodiment of the present disclosure, the plurality of sensors are arranged on different engine parts, in particular on different cylinders of the engine.

The controller of the present disclosure may comprise a microprocessor and a software program stored on non-transitory memory, the software program comprising program code comprising instructions that will, when running on the microprocessor, provide the functionality of the controller described herein.

In particular, the controller may be configured by the software program to perform the functions described herein automatically, for example on switch-on or when triggered by a control signal.

The controller may be in signal communication with the sensors, in particular via a communication bus. The software program may comprise instructions for evaluating a sequence and/or timing of information and/or signals received from the sensors.

The controller may control the switching of the power supply to the sensors via the microprocessor or via hardwired parts of the controller.

The controller may evaluate the sequence and/or timing of information and/or signals received from the sensors with respect to a sequence and/or switching on or off of a power supply.

In an embodiment, a correct sequence of information or signals received from the sensors may be stored in the controller, and used for determining whether the sensors are correctly mounted.

The present disclosure further comprises an engine comprising a plurality of sensors and a system as described above. The controller of the system may be a separate component, or may be integrated in the engine controller.

The present disclosure further comprises a method for checking a correct mounting of a plurality of sensors, the sensors may be mounted in an engine system, the method comprising receiving signals from the plurality of sensors,
monitoring a sequence and/or timing of the signals received from the sensors and
checking the correct mounting of the sensors by evaluating the sequence and/or timing of the signals with respect to a sequence and/or timing of a switching of a power supply to the sensors.

In an embodiment of the present disclosure, the method may comprise the step of checking the correct mounting of the sensors by checking whether a sequence and/or point in time at which signals from the sensor are received or no longer received corresponds to an expected sequence and/or point in time with respect to a switching on or off of the power supply to the sensors.

In an embodiment of the present disclosure, the method may comprise the step of controlling the switching on or off of the power supply to the sensors to occur in a predetermined sequence and/or at different points in time.

The method may be performed as described herein with respect to the system and controller of the present disclosure.

In particular, the method may use a system and controller as described above.

The present disclosure will now be described in more detail with respect to embodiments and drawings.

DETAILED DESCRIPTION

Figure 7:
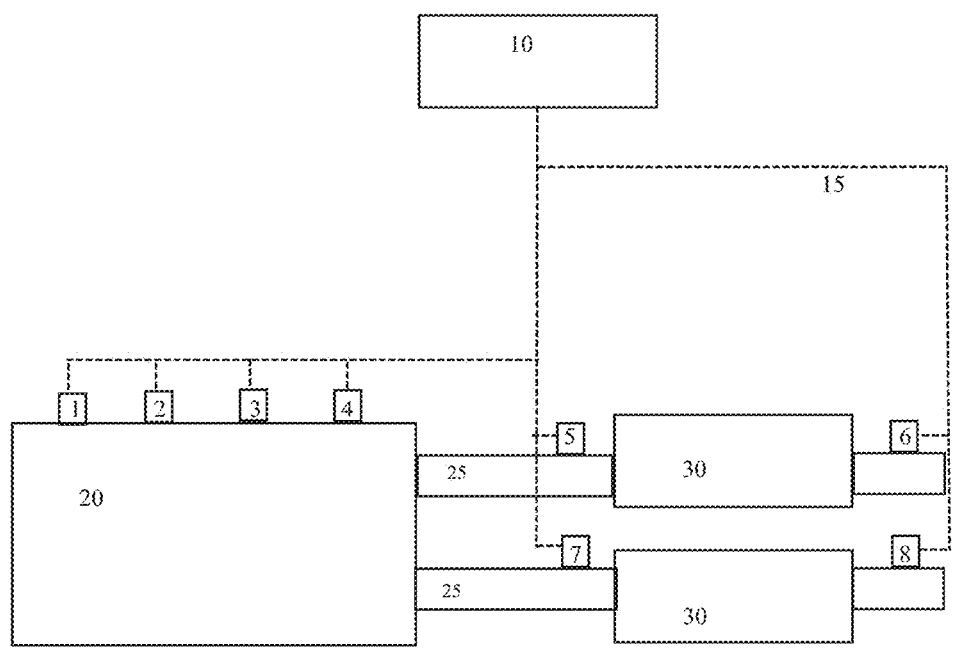
FIG. 7: an embodiment of a system of the present disclosure in a schematic drawing.

A schematic drawing of a general embodiment of a system of the present disclosure is shown in FIG. 7.

The system comprises a controller 10 and a plurality of sensors 1-8. The sensors are in communication with the controller via communication lines 15, for example of a bus system, such as a CAN bus or other serial bus. The communication lines 15 are also referred to as network in the following.

The sensors may in particular be used in an engine 20, such as an internal combustion engine. The controller 10 may in particular be part of an engine control unit (ECU).

For example, some of the sensors such as sensors 5 to 8 may be exhaust gas sensors arranged on exhaust gas ducts 25 of the engine 20. In particular, the sensors may be arranged upstream, on or downstream of a catalyst 30 arranged in an exhaust gas duct. In an embodiment, the sensors may measure NOx and/or NH3 in the exhaust gas in order to control an exhaust gas aftertreatment system, for example for controlling urea injection.

The engine 20 may comprise several exhaust gas ducts 25 with separate exhaust gas aftertreatment systems such as catalysts 30 arranged in parallel. Therefore, there may be a larger number of sensors used for controlling the exhaust gas aftertreatment systems.

Alternatively or in addition, some of the sensors such as sensors 1 to 4 are temperature sensors arranged on cylinder heads of the engine.

The controller 10 of the present disclosure is configured to monitor a timing of the signals received from the sensors 1 to 8 and to evaluate it with respect to a timing of a switching of a power supply to the sensors for checking the correct mounting of the sensors.

FIGS. 1 to 4 show different switching sequences that may be used for checking the correct mounting of the sensors.

All examples are for 3 sensors in order to make the schematics or timetables easier to understand, but the present disclosure and the working principles shown in the examples work with an unlimited number of sensors.

Figure 3:
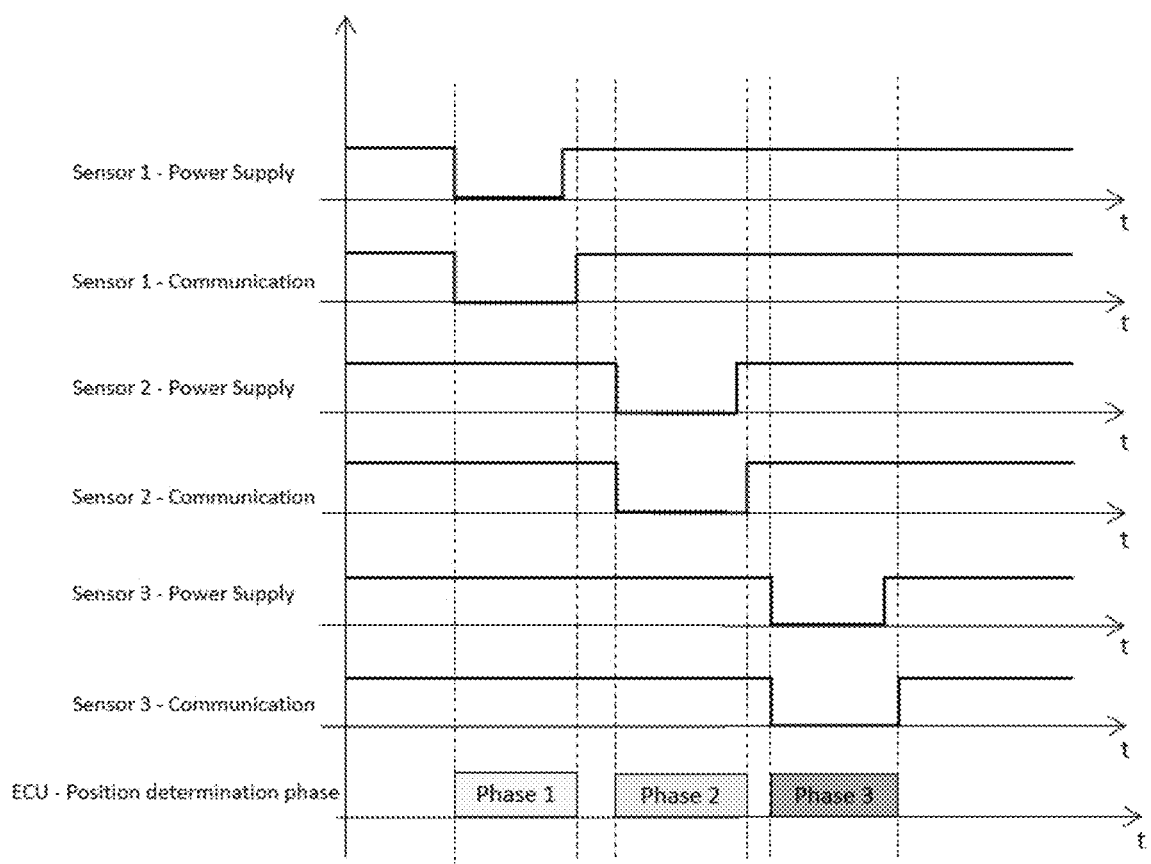
FIG. 3: A timeline for three sensors in a third embodiment where the power supply is sequentially switched-off for a predetermined time.
Figure 4:
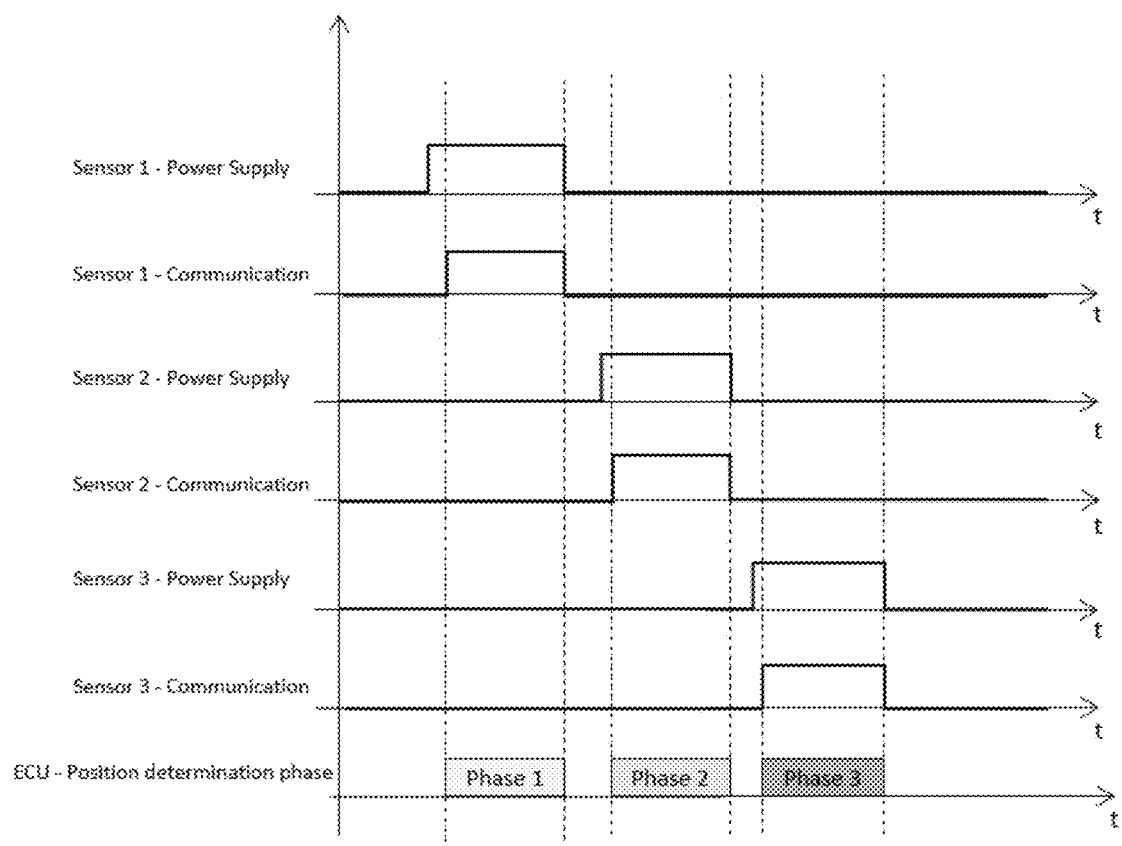
FIG. 4: A timeline for three sensors in a fourth embodiment where the power supply is sequentially switched-on for a predetermined time.

In the embodiments of the present disclosure shown in FIGS. 1 to 4, the power supply of the sensor is either:

temporally shifted (at start or stop) so that the transmission of information by the sensor is also shifted temporally (FIG. 1 and FIG. 2),
and/or
temporarily removed in order to interrupt the transmission of information by the sensors (FIG. 3)
and/or
temporarily provided in order to start the transmission of information by the sensors (FIG. 4).

This time shift, temporary removal or provision of the sensor information transmission is detected by the controller 10, which will check whether the actual offset or timing of missing information or provided information corresponds to the expected behavior.

If not a bad mounting will be detected by the controller 10 that supervises the sensors. The controller may in this case output a warning or error message in order to indicate that the sensors are not correctly mounted.

The present disclosure works with unlimited number of sensors.

Figure 1:
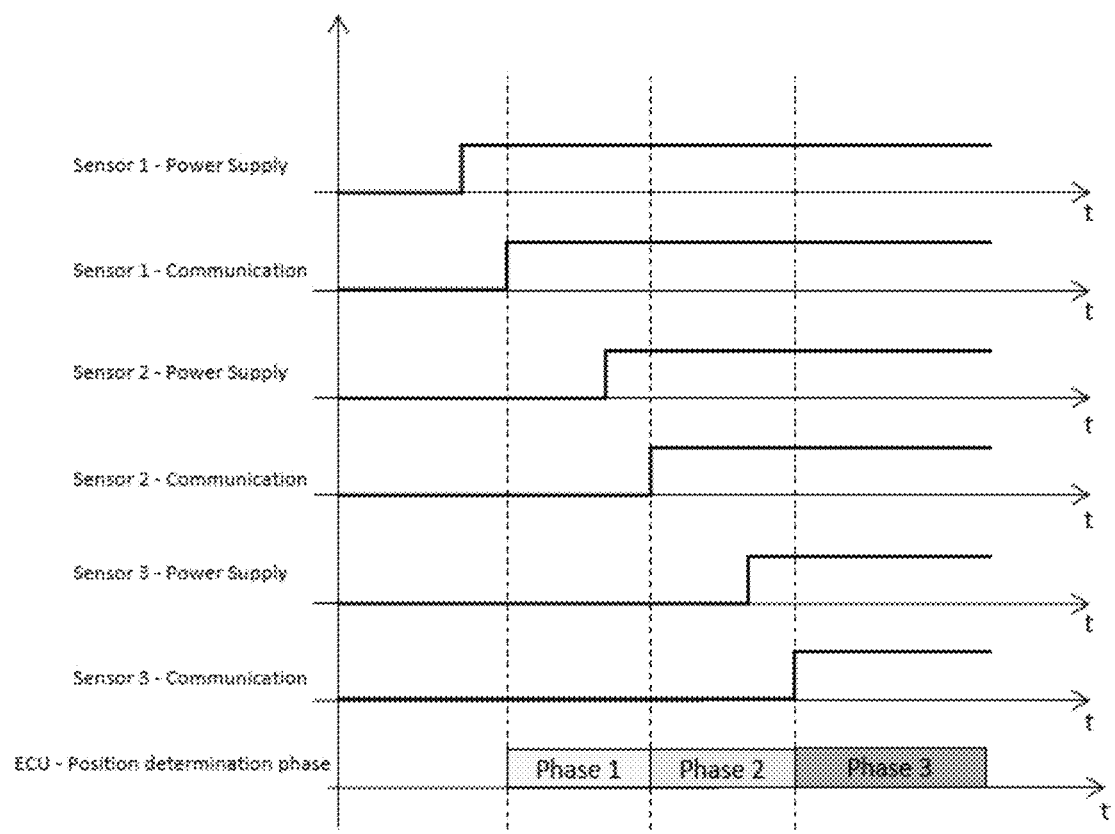
FIG. 1: A timeline for three sensors in a first embodiment where there is a sequential timing of switch-on at startup.

In the embodiment shown in FIG. 1, the timeline for three sensors at startup is shown with the following phases:

Phase 1: Sensor 1 available on network
Phase 2: Sensors 1 and 2 available on network
Phase 3: Sensors 1, 2 and 3 available on network In the embodiment shown in FIG. 1, the procedure to checking sensors 1 to N is as follows:

The first sensor 1 is fed with power, it starts and begins to send out information. The detection system of the controller 10 ensures that the information received corresponds to that of sensor 1.

The second sensor 2 is fed with power, it starts and begins to send out information. The detection system of the controller 10 ensures that the information received corresponds to that of sensor 2.

Sensor N is fed with power, it starts and begins to send out information. The detection system of the controller makes sure that the information received corresponds to that of sensor N.

Figure 2:
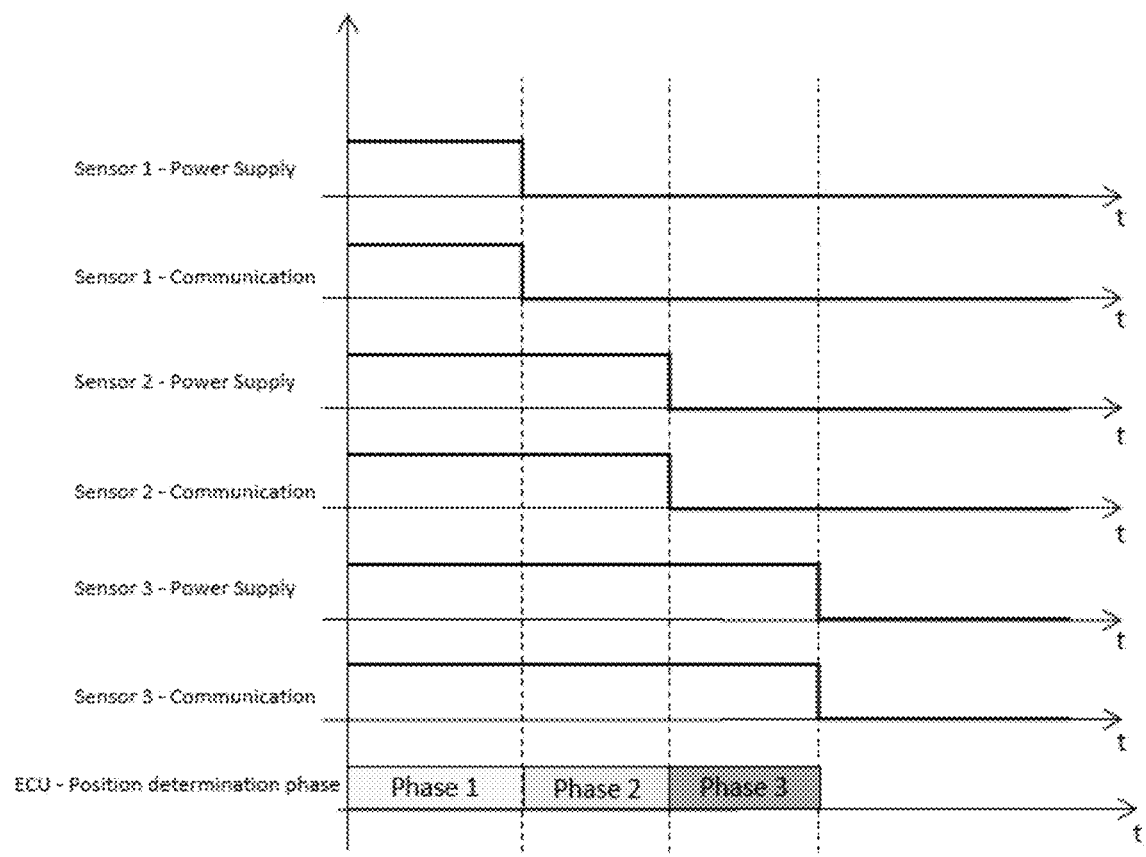
FIG. 2: A timeline for three sensors in a second embodiment where there is a sequential timing of switch-off is at stop.

In the embodiment shown in FIG. 2, the timeline for three sensors at stop is shown with the following phases:
Phase 1: All sensors available on network
Phase 2: Sensors 2 and 3 available on network
Phase 3: Sensor 3 available on network In the embodiment shown in FIG. 2, the procedure to checking sensors 1 to N is as follows:

Power to the first sensor 1 is cut off, it stops and stops sending information. The detection system of the controller ensures that the information corresponding to that of sensor 1 is no longer available.

Power to the second sensor 2 is cut off, it stops and stops sending information. The detection system of the controller ensures that the information corresponding to that of sensor 2 is no longer available.

Power supply to sensor N is cut off, it stops and stops sending information. The detection system of the controller ensures that the information corresponding to that of sensor N and is no longer available.

In the embodiment shown in FIG. 3, the drawing shows a timeline for three sensors with the following phases:
Phase 1: Sensors 2 and 3 available on network
Phase 2: Sensors 1 and 3 available on network
Phase 3: Sensors 1 and 2 available on network The individual sensors are therefore switched off for a predetermined period one after the other, and the controller checks whether the expected sensor is no longer available on the network.

In the embodiment shown in FIG. 4, the drawing shows a timeline for three sensors with the following phases:
Phase 1: Sensor 1 available on network
Phase 2: Sensor 2 available on network
Phase 3: Sensor 3 available on network The individual sensors are therefore switched on for a predetermined period one after the other, and the controller checks whether the expected sensor is available on the network.

The correct sequence, timing and configuration of the phases may be stored in the controller in order to determine whether the actual sequence, timing and configuration corresponds to the correct one.

The controller may in particular check the correct sequence, timing and configuration of the phases relative to each other, i.e. without reference to a particular starting point.

For example, the controller may determine the expected points in time for receiving or no longer receiving signals in any of the following phases from detecting the first phase.

Alternatively or in addition, the controller may control or determine the points in time at which the power supply is switched on or off, and determine the expected points in time for receiving or no longer receiving signals from the points in time at which the power supply is switched on or off.

There are different ways to configure the wiring of the controller to perform the above-described checks.

Figure 5:
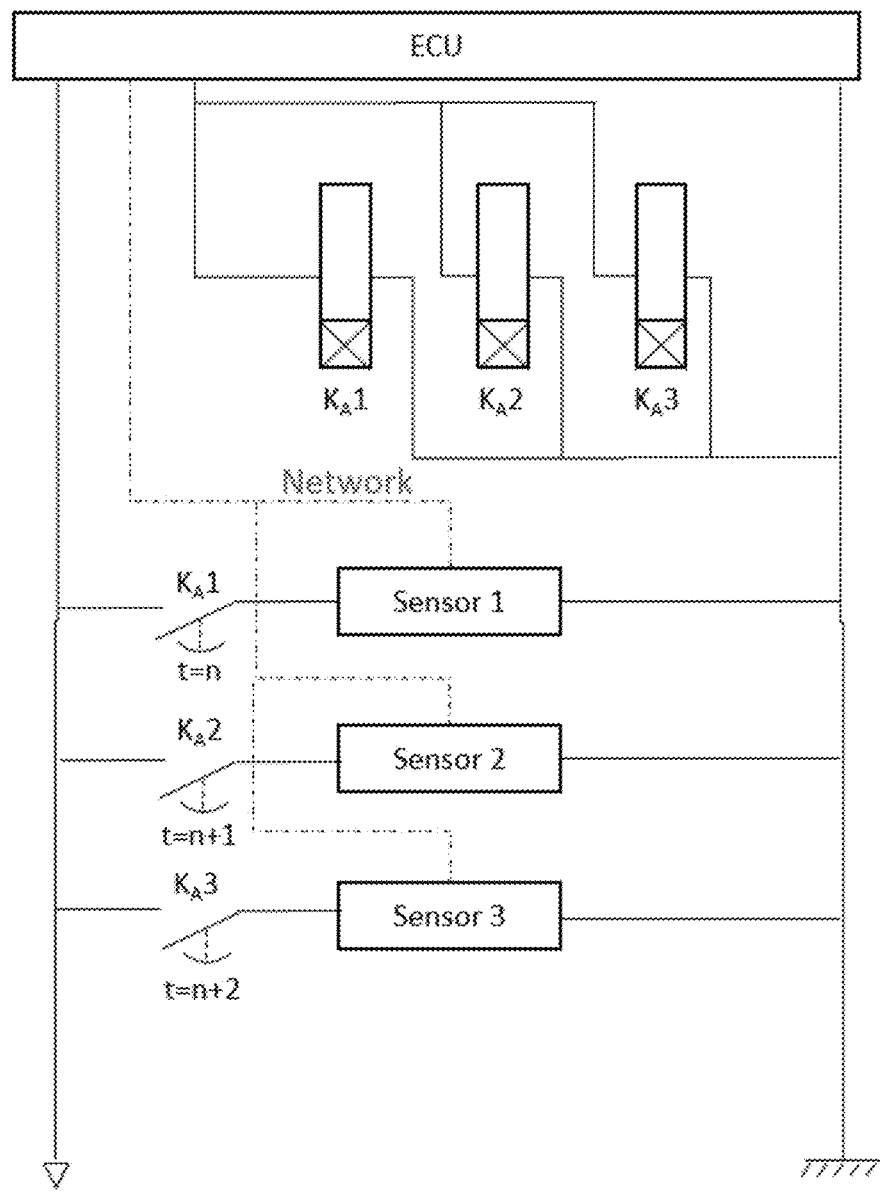
FIG. 5: an example of possible wiring for 3 sensors for startup sequencing.
Figure 6:
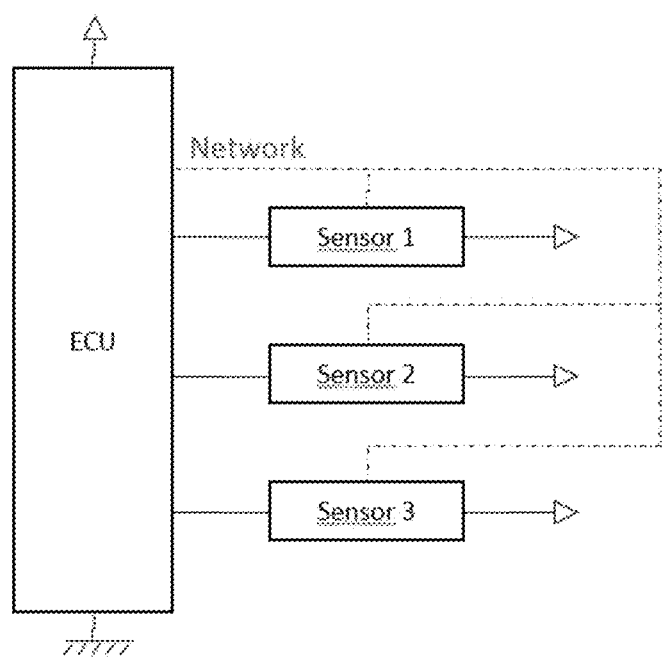
FIG. 6: an example of possible wiring for 3 sensors for any sequencing.

In the embodiment shown in FIG. 5, the sequential switching of the power supply to the sensors is provided by hard-wired control components.

In the embodiment, the hard-wired control components are configured to sequentially switch on power to the different sensors at power-on.

In particular, the power supply to each sensor i is controlled by a relay $K_A i$. The relays have a time delay for switching on the power supply, which is different for each relay. In particular, the relays are On-Delay relays normally open, with timed closed contact.

A similar hard-wiring could also be used for sequential power-off, but the sequential power on is preferred because it will allow a check of the correct mounting and functioning of the sensors each time the machine is started.

FIG. 5 shows a wiring diagram for an alternative embodiment, where the switching of the power supply to the sensors is controlled individually by a software program running on the controller. The controller may either directly control the power supply, or may control switches or relays that switch the power supply on and off.

The embodiment shown in FIG. 5 may implement any of the switching sequences shown above. In particular, the software program running on the controller may comprise instructions for switching on and off the power supply in any of the sequences shown above.

Further, a software program running on the controller may comprise instructions for checking that the sensors are available or not available on the network in the expected order and/or at the expected points in time.

The invention claimed is:

1. A system for checking a correct mounting of a plurality of sensors, comprising:
   a controller, wherein the controller comprises instructions configured to:
   switch a power supply on or off to different sensors of the plurality of sensors at different points in time; and
   receive signals from the plurality of sensors,
   wherein the controller further comprises instructions configured to:
   monitor a sequence and/or timing of the signals received from the plurality of sensors and evaluate the signals with respect to a sequence and/or timing of the switching of the power supply on and off to the different sensors of the plurality of sensors for checking the correct mounting of the plurality of sensors; and
   provide an indication that at least one of the plurality of sensors is not correctly mounted responsive to detecting an incorrect mounting of the plurality of sensors.

2. The system of claim 1, wherein the plurality of sensors are connected to a bus system and the signals from the plurality of sensors comprise communication signals exchanged via the bus system.

3. The system of claim 2, wherein the bus system is a CAN-bus system.

4. The system of any of claim 1, wherein the controller is configured to check the correct mounting of the plurality of sensors by checking whether the sequence and/or point in time at which signals from a sensor of the plurality of sensors are received or no longer received corresponds to an expected sequence and/or point in time with respect to a sequence and/or point in time of switching on or off the power supply to the plurality of sensors.

5. The system of claim 1, wherein the controller is configured to control the switching on or off of the power supply to the plurality of sensors to occur in a predetermined sequence.

6. The system of claim 5, wherein the controller is configured to delay or advance the switching on of the power supply to a first sensor of the plurality of sensors with respect to a second sensor of the plurality of sensors at start-up and/or to delay or advance the switching off of the power supply to the first sensor of the plurality of sensors with respect to the second sensor of the plurality of sensors at shut-down.

7. The system of claim 6, wherein the plurality of sensors are switched on one after the other on start-up or switched off one after the other on shut-down.

8. The system of claim 1, wherein the controller comprises a plurality of hardware switches configured to control the timing of the switching of the power supply to the plurality of sensors.

9. The system of claim 8, wherein the plurality of hardware switches have different time-delays for switching on or off following a switching on or off signal, and wherein the plurality of hardware switches are on- or off-delay relays normally open with timed closed or opened contact.

10. The system of claim 1, wherein the controller is configured to temporarily switch the power supply to a first sensor of the plurality of sensors on while the power supply to a second sensor of the plurality of sensors and to all other sensors of the plurality of sensors remains switched off and/or to temporarily switch the power supply to the first sensor of the plurality of sensors off while the power supply to the second sensor of the plurality of sensors and to all other sensors of the plurality of sensors remains switched on.

11. The system of claim 1, wherein the controller comprises a microcontroller for controlling the timing of the switching of the power supply to the plurality of sensors.

12. The system of claim 1, wherein the plurality of sensors are of a same type and only differ in each having a respective identifier.

13. The system of claim 1, wherein the plurality of sensors are NOx-sensors and/or NH3-sensors and/or temperature sensors.

14. The system of claim 1, wherein the plurality of sensors are sensors arranged on an exhaust gas aftertreatment system of an engine and/or are sensors arranged on different engine parts, in particular on different cylinders of the engine.

15. An engine comprising the plurality of sensors and the system according to claim 1.

16. A method for checking a correct mounting of a plurality of sensors, the method comprising:
via a controller,
switching a power supply on or off to different sensors of the plurality of sensors at different points in time;
receiving signals from the plurality of sensors;
monitoring a sequence and/or timing of the signals received from the plurality of sensors;
checking the correct mounting of the plurality of sensors by evaluating the sequence and/or timing of the signals received from the plurality of sensors with respect to a sequence and/or timing of a switching of a power supply to the plurality of sensors;
detecting an incorrect mounting of at least one of the plurality of sensors; and
providing an indication that the at least one of the plurality of sensors is not correctly mounted responsive to detecting the incorrect mounting of the at least one of the plurality of sensors.

17. The method of claim 16, further comprising:
checking the correct mounting of the sensors by checking whether the sequence and/or point in time at which signals from the plurality of sensors are received or no longer received corresponds to a sequence and/or expected point in time with respect to a switching on or off of the power supply to the plurality of sensors; and/or
controlling the switching on or off of the power supply to the plurality of sensors to occur in a predetermined sequence.

18. The method of claim 16, wherein the plurality of sensors are mounted in an engine system.

19. The system of claim 1, wherein the plurality of sensors are mounted in an engine system.

20. The system of claim 1, wherein providing the indication includes outputting a warning or error message.

* * * * *